April 7, 1970 — J. E. HEIDER — 3,504,817
CLOSURE AND METHOD OF APPLYING SAME
Filed May 14, 1968 — 2 Sheets-Sheet 1

INVENTOR.
JAMES E. HEIDER
BY Donald K. Wedding
W. A. Schaich
ATTORNEYS

April 7, 1970   J. E. HEIDER   3,504,817
CLOSURE AND METHOD OF APPLYING SAME
Filed May 14, 1968   2 Sheets-Sheet 2

INVENTOR.
JAMES E. HEIDER
BY Donald K. Wedding
W. A. Schaich
ATTORNEYS

United States Patent Office 3,504,817
Patented Apr. 7, 1970

3,504,817
CLOSURE AND METHOD OF APPLYING SAME
James E. Heider, Toledo, Ohio, assignor to Owens-Illinois, Inc., a corporation of Ohio
Filed May 14, 1968, Ser. No. 728,969
Int. Cl. B65d 41/02
U.S. Cl. 215—38                              20 Claims

ABSTRACT OF THE DISCLOSURE

This invention relates to a closure for application to a finish portion of a container characterized by the incorporation in such closure of an annular band of thermoplastic material having incorporated therein a heat-actuated foaming agent thereby permitting the foaming of the annular band of thermoplastic material after the closure is loosely applied to the container finish. Additionally, this invention relates to the method of applying closures to containers involving the in situ expansion of a thermoplastic portion of the closure into intimate engagement with the container finish after the application of the closure to the container finish.

---

This invention relates to a novel closure construction and to the method of applying such closures to containers.

It has long been recognized in the closure art that one of the most difficult problems to overcome is the relatively wide dimensional variations that are encountered in the finish dimensions of any container produced by a commercially feasible manufacturing operation. Whether the container be fabricated from glass, metal, plastic, paper, or laminations of paper and plastic or paper and metal foil, there will be dimensional variations in the finish of the container when containers are mass produced by any method which is economically and commercially feasible. If the closure can be applied ot the container finish as a loose-fitting shell or plug and then modified or deformed in situ to achieve a desired sealing relationship with the container finish, it is obvious that the mass production dimensional variations would be overcome. This approach has heretofore been utilized in the so-called roll-on closures wherein an aluminum shell is placed over the neck of a glass bottle and the walls of such shell are deformed by a rolling operation to conform to the bottle finish. Another related technique is the heat sealing of a plastic disc across the mouth of a container.

Those skilled in the art will recognize that neither of these two approaches resolve all of the problems of the closure industry inasmuch as the roll-on operation is necessarily limited to a soft, readily deformable metal such as aluminum, while any type of heat-sealed plastic closure necessarily means that once the closure is removed, it cannot be re-applied for resealing a partially empty container.

Accordingly, it is an object of this invention to provide an improved closure and an improved method for applying such closures to any type of container finish.

A particular object of this invention is to provide an improved closure characterized by the incorporation in such closure of an annular band or layer of thermoplastic material having dispersed therein a heat actuated foaming agent. In accordance with the method of this invention, such closure is applied to a container finish as a loosely-fitting shell or plug and the thermoplastic material in the closure is heated, preferably by electromagnetic energy, to effect the foaming of a desired portion of the thermoplastic material in situ and the expansion of the thermoplastic material into intimate engagement with the container finish.

Other objects and advantages of this invention will become apparent to those skilled in the art from the following detailed description taken in conjunction with the annexed sheets of drawings, on which there are shown several embodiments of the invention.

On the drawings

Figure 1:
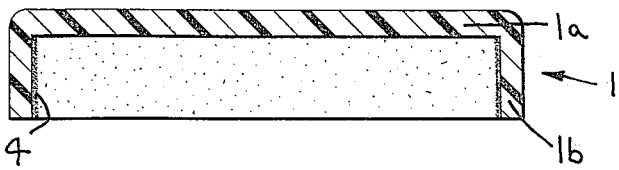
FIGURE 1 is a sectional view of one modification of a closure embodying this invention.

Since it will become apparent to those skilled in the art that the principle embodied in this invention may be incorporated in any type of closure, the various specific embodiments of this invention disclosed in the drawings and to be hereafter described should be considered as merely schematic or exemplary representations of embodiments of the invention.

In FIGURE 1 there is shown a very simple type closure 1 formed entirely of an appropriate thermoplastic material comprising a panel portion 1a which is adapted to span the container opening and a depending annular skirt portion 1b which is proportioned to loosely surround the neck of the container to which the closure is to be applied. Closure 1 is formed by injection molding and, prior to introducing the plasticized thermoplastic material into the injection mold, a suitable heat actuated foaming agent is incorporated in such material. The foaming agent utilized should have the property, which is common to many of these agents, of not foaming when subjected to pressures of the same magnitude normally encountered in the injection molding operation. Hence, the foaming agent will be incorporated in the thermoplastic material, the closure formed by injection molding into the configuration of FIGURE 1, and then sufficiently cooled in the injection mold while the molding pressure is maintained so as to insure that substantially no foaming of the forming material occurs when the closure 1 is removed from the mold.

Figure 2:
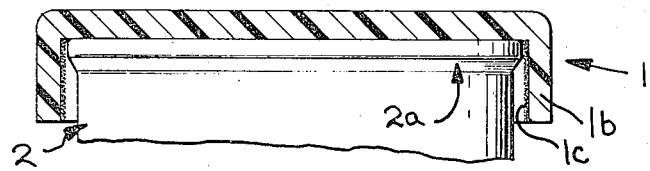
FIGURE 2 is a sectional view illustrating the initial application of the closure of FIGURE 1 to a container finish.

The closure 1 is then applied in loosely-fitting relationship to the finish of the container 2 (FIGURE 2). This particular finish is illustrated as comprising a simple external bead portion 2a surrounding the mouth of the container 2. Heat from a suitable source is then selectively applied to the skirt portion 1b of the closure 1 and preferably to the annular internal surface 1c of such skirt portion. While there are a number of ways of selectively applying heat to such portion of the closure, as for example by preheating the bead portion 2a of the container 2, I prefer to selectively apply heat to the annular internal closure surface 1c by the application of electromagnetic energy.

Figure 3:
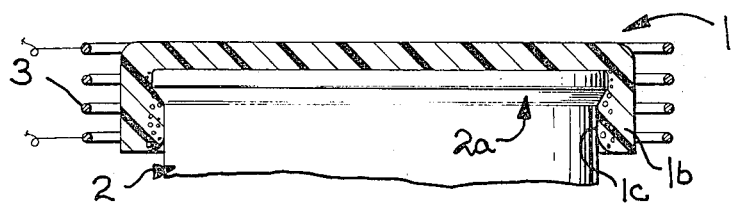
FIGURE 3 is a view similar to FIGURE 2, but illustrating the in situ expansion of the thermoplastic material of the closure to conform to the container finish.

Referring to FIGURE 3, electromagnetic energy can be conveniently supplied by a coil 3 which is designed to surround closure 1 and produce an electromagnetic field traversing the skirt portion 1b of the closure. Coil 3 is supplied with current from a suitable alternating current source (not shown). Prior to applying the closure in accordance with the preferred embodiment of this invention, a band 4 of metallic or polar particles is applied to the annular internal surface 1c of the closure 1. Alternatively, the particles 4 may be dispersed throughout the skirt portion 1b. If the heating is to be accomplished primarily by eddy current effects, such particles should be a good conducting material such as aluminum or copper. The particle size should, in any event, be greater than .001 inch in diameter. On the other hand, the selective heating may also be accomplished by hysteresis loss effects produced by an electromagnetic field, and in this case, the particles may be formed from a ferromagnetic material and the coil 3 may be provided with a ferromagnetic core to produce a high intensity electromagnetic field. Particle size is not an important factor in heating by hysteresis loss.

If high frequency dielectric heating is to be employed, the particles can be formed from any polar material that is capable of being heated by high frequency electromagnetic field to a substantially greater degree than the thermoplastic material. In such event, the appropriate high frequency electric field may be applied between a cylindrical surrounding electrode 5 and the adjacent surface of the container 2. If the container is formed of a normally non-conducting material, then a conductive coating (not shown) obviously must be applied to at least that portion of the finish that is opposite the thermoplastic portion of the closure that is to be selectively heated. If the foamable thermoplastic material inherently possesses polar properties, then the application of a band of particles 4 is unnecessary to effect the selective heating by the dielectric heating approach, but the applied electromagnetic field should be concentrated in those areas of the foamable thermoplastic material in which expansion is desired.

Figure 3A:
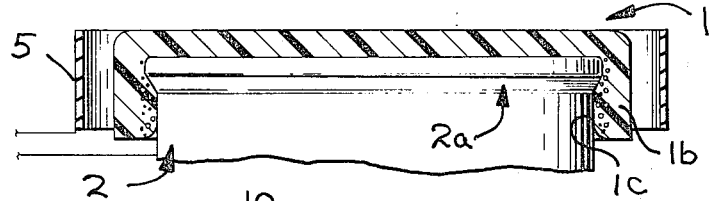
FIGURE 3a is a view similar to FIGURE 3, but illustrating the accomplishment of the heating step by dielectric energy.

In any event, the selective application of heat to the thermoplastic rim portion of closure 1 results in the localized heating of the thermoplastic skirt portion of the closure, and such heating is continued to a degree to produce actuation of the foaming material dispersed in the thermoplastic material, thus effecting expansion of the annular surface 1c of the closure into intimate engagement with the adjacent surface of the finish 2a of the container 2, as shown in FIGURES 3 and 3a.

Those skilled in the art will recognize that there exists in the art a large variety of thermoplastic materials which are suitable for use as closures and correspondingly a large variety of foaming agents that may be dispersed in a selected thermoplastic material during the forming of the closure and be capable of subsequent actuation by heating. See for example the foaming agents listed in the article entitled "Foamed Plastics," appearing on page 370 of Modern Plastics Encyclopedia, 1967 edition.

The resultant selective expansion of the closure 1 into engagement with the container finish 2a will be completely independent of the dimensional tolerance variations of both the container finish and the closure. The expansion of the closure by foaming while the closure is positioned in assembled relationship to the container finish, i.e. in situ expansion of the closure, necessarily results in a tailoring of the particular closure to accurately conform to the particular container finish to which it is applied. As a result, the possibility of sealing failures due to dimensional variations of either the closure and container finish are substantially eliminated, while the permissible dimensional tolerances of both the closure and container finish are substantially increased.

Figure 4:
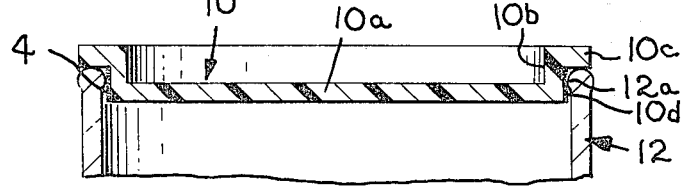
FIGURE 4 is a sectional view illustrating a second closure modification embodying this invention as initally appled to a container finish.

Fefering now to FIGURE 4, there is shown a plug-type closure 10 embodying this invention. Such closure includes a panel portion 10a dimensioned to span the container opening and an upstanding rim portion 10b terminating in a radially-directed flange portion 10c. As in the case of the closure of FIGURE 1, closure 10 is formed of a thermoplastic material having dispersed therein a heat-actuated foaming agent. The external dimensions of the upstanding rim portion 10b are dimensioned so as to permit such rim portion to fit loosely within the mouth of the container finish of a container 12. The finish of the container 12 is of the type having an inwardly-directed retaining bead portion 12a. The localized selective heating of the external surface 10d of the upstanding rim portion 10b is effected by any one of the means heretofore mentioned in connection with the closure of FIGURE 1. In accordance with the preferred embodiment of this invention, a band of metallic or polar particles 4 may be applied to such surface or dispersed throughout rim portion 10b and utilized to effect the heating through the application of electromagnetic energy in any of the manners heretofore discussed.

Figure 5:
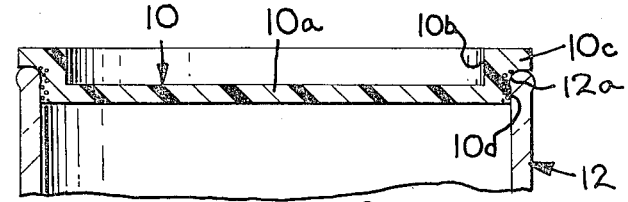
FIGURE 5 is a sectional view illustrating the in situ expansion of the thermoplastic material of the closure of FIGURE 4 into intimate engagement with the closure finish.

Referring to FIGURE 5, such electromagnetic energy results in the selective expansion of the external surface 10d of the upstanding rim portion 10b of the closure 10 into initimate relationship with the inner walls of the container finish and effects the retention of the closure on such container by the expansion of such material beneath the upwardly-projecting retaining bead 12a of the container finish.

Figure 6:
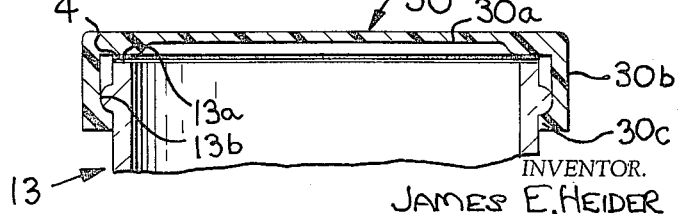
FIGURES 6 and 7 are sectional views of another closure construction embodying this invention showing respectively the closure as initially applied to the container finish and the final configuration of the closure following the in situ expansion of a thermoplastic portion of the closure into intimate engagement with the container finish.
Figure 7:
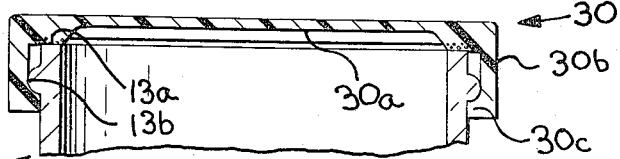

Still another embodiment of this invention is illustrated in FIGURES 6 and 7 wherein there is shown a thermoplastic snap-type closure 20 for cooperation with a container finish 13 having a radial end-sealing surface 13a and an external closure-retaining rib 13b. The closure 30 comprises a panel portion 30a spanning the mouth of the container finish and an integral annular depending flange portion 30b surrounding the external sidewalls of the container finish 13. The lower extremities of the closure flange 30b are inwardly enlarged as at 30c so as to provide a snap-fitting engagement with the closure retaining rib 13b of the container finish 13. Again, the closure 30 is formed of a thermoplastic material having incorporated therein a suitable heat-actuated foaming agent. In this embodiment, a band of metallic or polar particles 4 is applied to, or dispersed throughout, those portions of the closure 30 which overlies the sealing surface 13a of the container finish. The application of electromagnetic energy to such particles results (FIGURE 7) in the localized expansion of such annular portion of the closure 30 into snug-fitting sealing engagement with the sealing surface 13a of the container finish, irrespective of any dips or irregularities in surface 13a.

Figure 8:
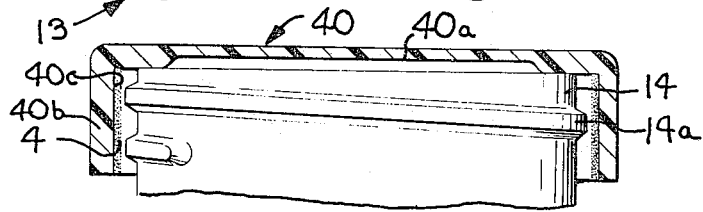
FIGURES 8 and 9 are respectively sectional views of a further closure construction embodying this invention showing respectively the closure as initially applied to the container finish and the final configuration of the closure following the in situ expansion of a thermoplastic portion of the closure into intimate engagement with the container finish.
Figure 9:
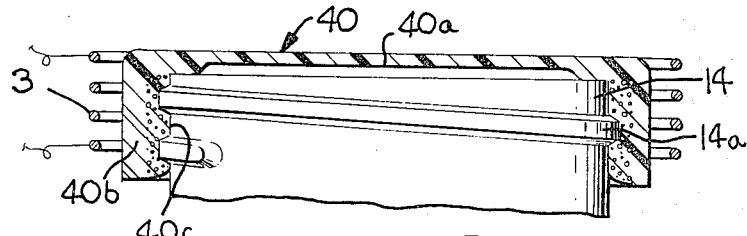

The principles of this invention may be applied to in situ form threads on a closure shell having a loose-fitting engagement with a thread-type container finish, resulting in a threaded closure which can only be removed by unscrewing the closure relative to the container. Referring to FIGURES 8 and 9, there is shown a container finish 14 having a threaded closure-retaining means 14a on the neck portion of the finish. The closure 40 comprises a panel portion 40a dimensioned to span the container finish and depending cylindrical sidewall portions 40b which may be applied to the container finish 14 in loosely fitting relationship by relative axial movement. Again, the closure 40 is formed from a thermoplastic material having incorporated therein a suitable heat-actuated foaming agent. The selective application of heat to the internal surfaces 40c of the cylindrical wall portion 40b of closure 40 will result in an expansion of such surfaces into intimate engagement with the threaded sidewalls of the container finish 14. Again, such heating may be effected by applying metallic or polar particles 4 to the inner surfaces of the sidewalls 40b, or dispersing such particles throughout the cylindrical wall portion 40b, and heating such particles by electromagnetic energy applied by coil 3 as illustrated in FIGURE 9 or by any of the other selective heating expedients heretofore discussed.

Figure 10:
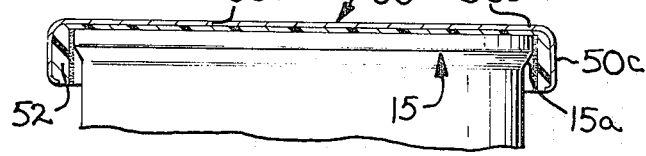
FIGURES 10 and 11 are sectional views illustrating a metal shell-type closure embodying this invention showing respectively the closure as initially applied to the container and the final configuration of the closure after in situ expansion of a thermoplastic portion of the closure into intimate engagement with the container finish.
Figure 11:
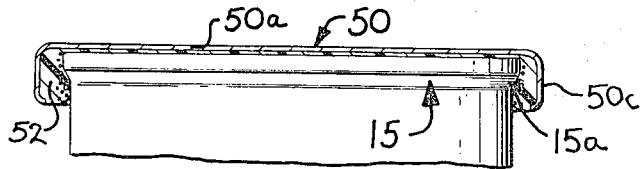

It is not necessary in the practice of this invention for the entire closure to be formed of a thermoplastic material as has been the case in the examples so far. Referring to FIGURES 10 and 11, there is shown a closure 50 comprising a thin metal shell 50a which is preferably formed of aluminum or similar light-weight metallic material. The closure shell comprises a panel portion 50b and depending sidewall portions 50c. A customary organic plastic coating or lacquer (not shown) is applied across the entire internal surfaces of the metal shell 50 to protect same from attack by the products retained by the closure. Additionally, an annular band of thermoplastic material 52 is applied to the internal surfaces of the sidewalls 50c and a portion of the adjoining periphery of the panel portion 50b. The thermoplastic band 52 has dispersed therein a suitable heat-actuated foaming agent.

The annular band 52 of thermoplastic material may be applied by any one of a number of methods known in the art, for example the flow-in method disclosed in U.S. Patent No. 2,528,506. With this procedure, the thermoplastic material is melted and directed under modest pressure to a discharge nozzle. The nozzle is positioned adjacent the interior rim of the metal shell 50a and relative rotation of the metal shell 50a and the nozzle results in the depositing of the annular layer 52 of the thermoplastic material. For this method of application, the foaming agent incorporated in the thermoplastic material obviously must be selected to have a foaming temperature higher than the melting temperature of the thermosplastic material so that foaming will not occur during the application of the layer of the molten thermosplastic material 52 to the metal shell 50a.

Such closure 50 may be loosely applied to a bead-type container finish 15 having an externally-projecting retaining bead 15a formed at the mouth of the finish. Selective heating of the thermoplastic material 52 is then accomplished in any manner heretofore discussed; e.g. a band of metallic or polar particles 4 is applied to the internal surfaces of the thermoplastic band 52 or such particles are dispersed throughout the material 52, and, as illustrated in FIGURE 11, such particles are selectively heated by electromagnetic energy to effect the heating of the thermoplastic material, and actuation of the foaming agent and the expansion of the thermoplastic material 52 into intimate engagement with the container finish.

If the metallic closure shell 50 is formed of a ferromagnetic material, such as tin plate, then it would probably be more desirable to effect the heating of the band of materials 4 by dielectric heating in a high frequency electrical field, applied in the manner described in connection with FIGURE 3a. On the other hand, if the metallic shell 50 is formed from copper or aluminum, then the particles should be of ferri-magnetic material and the magnetic hysteresis effect utilized to effect the heating of such particles. Lastly, it is possible with the metallic shell modifications of closure embodying this invention to eliminate the particles 4 and effect the heating of the thermoplastic material adjacent to the periphery of the metal shell 50 by inducing eddy currents in such metal shell, which currents will normally be concentrated in the rim 50c of the shell and thus heat the adjacent band of thermoplastic material 52 by conduction from the outside of the band to the inside.

Figure 12:
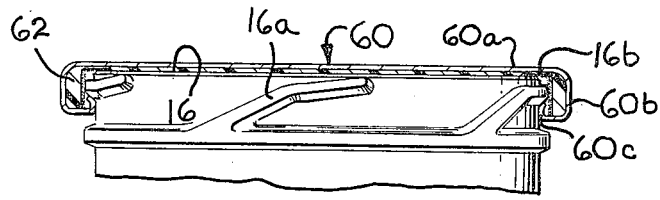
FIGURES 12 and 13 are sectional views illustrating another metal shell-type closure embodying this invention showing respectively the closure as initially applied to the container and the final configuration of the closure after in situ expansion of a thermoplastic portion of the closure into intimate engagement with the container finish.
Figure 13:
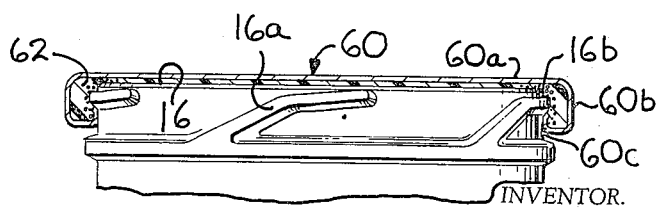

In the final modification of this invention illustrated in FIGURES 12 and 13, a closure 60 is provided comprising a metallic shell 60a having an integral annular depending skirt portion 60b. The lower extremities of skirt portion 60a are deformed in conventional fashion to provide inwardly-projecting lugs 60c which are dimensioned to cooperate with an externally-threaded lug-type finish 16a provided on the sidewalls of the container finish 16. Container finish 16 is provided with an inclined annular sealing area 16b located at the external corner of the container finish. The interior surface of the closure shell 60 is conveniently provided with a protective layer of organic plastic material such as plastisol or lacquer (not shown). Additionally, a band of thermoplastic material 62 is applied to the internal surface of the closure shell 60 in overlying relationship to the container sealing surface 16c and the threads 16a. The band of thermoplastic material 62 may be expanded in situ into intimate engagement with the container sealing surface 16c and the threads 16a through the application of heat to metallic or polar particles 4 provided on, or dispersed in, such thermoplastic band 62 by virtue of electromagnetic energy supplied in any of the manners heretofore discussed. This construction results in a lug-type closure which is initially applied to, or removed from, the container by a twisting movement.

From the foregoing description of a subsequent number of different types of closures that can be applied to containers in accordance with this invention, it is apparent that the in situ expansion of a thermoplastic portion of such closure may be utilized to produce the mechanism on the closure which insures its retention on the container finish, as illustrated by the examples of FIGURES 1 through 3, 10 and 11, or where such selective in situ expansion of the thermoplastic material may be utilized to produce the actual sealing engagement of the closure with the container finish as illustrated by the examples of FIGURES 6, 7, 12, and 13. It will also be recognized that the method of this invention may be utilized to produce a complete barrier to insect infestation, which is a problem encountered in lug-type closures, through the expedient illustrated in FIGURES 10, 11, 12, and 13 of producing an intimate engagement of all the adjacent thermoplastic portions of the closure with the threads of the container.

Other modifications and applications of this invention will be readily apparent to those skilled in the art, and it is intended that the scope of the invention be expressed solely by the appended claims.

I claim:

1. A closure for use with a container finish comprising a panel portion constructed and arranged to span the container opening, said closure having a thermoplastic portion thereof constructed and arranged to lie in close proximity to a portion of the container finish, said thermoplastic portion having incorporated therein a heat-actuated foaming agent, whereby heating of said thermoplastic portion will expand same by foaming into intimate engagement with said container finish.

2. A closure for use with a container finish comprising a panel portion constructed and arranged to span the container opening, said closure having an annular thermoplastic portion thereof constructed and arranged to lie in close proximity to an annular portion of the container finish, said thermoplastic portion having incorporated therein a heat-actuated foaming agent, whereby heating of said annular thermoplastic portion will expand same by foaming into intimate engagement with said container finish.

3. The closure defined in claim 2 plus a plurality of particles dispersed around said annular thermoplastic portion, said particles being capable of being heated by electromagnetic energy.

4. The closure defined in claim 2 plus an annular metallic shell surrounding at least said annular thermoplastic portion of said closure, whereby selective heating of said shell will effect the heating of said annular thermoplastic portion.

5. A closure as defined in claim 3 wherein said particles are applied on the surface of said annular thermoplastic portion.

6. A closure as defined in claim 3 wherein said particles are dispersed throughout said thermoplastic material.

7. A closure for use with a container finish having closure-retaining means formed thereon, comprising a panel portion constructed and arranged to span the container opening and an annular skirt constructed and arranged to lie in close proximity to said closure retaining means, the surface of said closure skirt lying adjacent to said closure retaining means comprising a thermoplastic material having a heat-actuated foaming agent dispersed therein, and a plurality of particles, heatable by electro magnetic energy, dispersed in said skirt.

8. A closure for use with a container finish having an annular sealing surface and closure-retaining means formed thereon, comprising a metallic shell constructed and arranged to span the container opening and having an annular skirt constructed and arranged to overlie said closure-retaining means, an annular layer of gasket material mounted in said shell and constructed and arranged to engage said annular sealing surface of the closure finish, an annular band of thermoplastic material applied to said annular skirt of said shell, one surface of said annular layer of thermoplastic material being disposed in close proximity to said closure-retaining means, said thermoplastic material having a heat-actuated foaming agent dispersed therein whereby heating of said anular layer of thermoplastic material will expand same into intimate engagement with said closure-retaining means.

9. The closure defined in claim 7 plus a plurality of particles dispersed around said annular thermoplastic band, said particles being heatable by the application of electromagnetic energy.

10. The method of applying a closure in sealing relationship to a container neck opening comprising the steps of:
(1) forming a closure at least in part from a thermoplastic material having dispersed therein a heat-actuable foaming agent, said closure being constructed and arranged to span the neck opening and having an annular thermoplastic portion thereof constructed and arranged to lie in close proximity to an annular portion of the container neck,
(2) applying said closure to the container neck, and
(3) heating said annular thermoplastic portion of said closure sufficiently to actuate the foaming agent and expand such annular portion into engagement with the container neck.

11. The method set forth in claim 10, wherein said heating is accomplished by the application of electromagnetic energy to the closure.

12. The method of applying a closure in sealing relationship to a container neck opening comprising the steps of:
(1) forming a closure at least in part from a thermoplastic material having dispersed therein a heat-actuable foaming agent, said closure being constructed and arranged to span the neck opening and having an annular thermoplastic portion thereof constructed and arranged to lie in close proximity to an annular portion of the container neck,
(2) applying a band of particles to said annular thermoplastic portion of said closure, which are heatable by electromagnetic energy,
(3) applying said closure to the container neck, and
(4) applying electromagnetic energy to said annular band of metallic particles to heat said annular thermoplastic portion of said closure sufficiently to actuate the foaming agent and expand said thermoplastic portion into engagement with the container neck.

13. The method of claim 12 wherein said particles are highly conductive, and said electromagnetic energy produces eddy currents therein to heat same.

14. The method of claim 12 wherein said particles are ferrimagnetic and said electromagnetic energy heats same by hysteresis.

15. The method of claim 12 wherein said particles are polar and said electromagnetic energy heats same dielectrically.

16. The method of applying a closure in sealing relationship to a container neck opening comprising the steps of:
(1) forming a closure at least in part from a thermoplastic material having dispersed therein a heat-actuable foaming agent and a plurality of particles which are heatable by electromagnetic energy, said closure being constructed and arranged to span the neck opening and having an annular thermoplastic portion thereof constructed and arranged to lie in close proximity to an annular portion of the container neck,
(2) applying said closure to the container neck, and
(3) applying electromagnetic energy to said particles to heat said annular thermoplastic portion of said closure sufficiently to actuate the foaming agent and expand said thermoplastic portion into engagement with the container neck.

17. The method of claim 16 wherein said particles are highly conductive and said electromagnetic energy produces eddy currents therein to heat same.

18. The method of claim 16 wherein said particles are ferrimagnetic and said electromagnetic energy heats same by hysteresis.

19. The method of claim 16 wherein said particles are polar and said electromagnetic energy heats same dielectrically.

20. The method of applying a closure in sealing relationship to a container neck opening comprising the steps of:
(1) forming a metallic closure shell constructed and arranged to span the neck opening,
(2) incorporating in said metallic shell an annular band of thermoplastic material constructed and arranged to lie in close proximity to an annular portion of the container neck, and containing a heat-actuable foaming agent,
(3) applying said portion to the container neck, and
(4) heating by electromagnetic energy those portions of said metallic shell that are in proximity to said annular thermoplastic portion sufficiently to actuate the foaming agent and expand such annular thermoplastic portion into engagement with the neck.

References Cited
UNITED STATES PATENTS 3,321,102 5/1967 Simmons _____ 220—47
3,417,538 12/1968 Herohama _____ 215—38 XR U.S. Cl. X.R.

53—42; 150—.5; 220—47, 66

GEORGE T. HALL, Primary Examiner